US00RE41735E

(19) United States
(12) Reissued Patent
Kuroda

(10) Patent Number: US RE41,735 E
(45) Date of Reissued Patent: Sep. 21, 2010

(54) WRITABLE OPTICAL DISC HAVING A PLURALITY OF CHAPTERS EACH HAVING RECORDING AREA, MANAGEMENT AREA AND PARTITION AREA PROVIDED THEREIN

(75) Inventor: Kazuo Kuroda, Tokorozawa (JP)

(73) Assignee: Pioneer Electronic Corporation, Tokyo (JP)

(21) Appl. No.: 12/081,941

(22) Filed: Apr. 23, 2008

Related U.S. Patent Documents

Reissue of:
(64) Patent No.: 5,889,742
Issued: Mar. 30, 1999
Appl. No.: 09/111,782
Filed: Jul. 8, 1998

U.S. Applications:

(62) Division of application No. 08/672,035, filed on Jun. 26, 1996, now Pat. No. 5,808,992.

(30) Foreign Application Priority Data

Jun. 26, 1995 (JP) ..... 7-159643

(51) Int. Cl.
*G11B 20/12* (2006.01)

(52) U.S. Cl. ..... 369/53.24; 369/275.3; 369/59.25
(58) Field of Classification Search ..... 369/59.25, 369/59.26, 275.3, 53.2, 53.24
See application file for complete search history.

(56) References Cited

U.S. PATENT DOCUMENTS

| | | | | |
|---|---|---|---|---|
| 4,774,700 | A | | 9/1988 | Satoh et al. |
| 4,937,804 | A | | 6/1990 | Ishihara |
| 4,972,399 | A | | 11/1990 | Miyasaka |
| 5,107,481 | A | | 4/1992 | Miki et al. |
| 5,132,954 | A | | 7/1992 | Kulakowski et al. |
| 5,289,450 | A | | 2/1994 | Mizumoto et al. |
| 5,321,824 | A | | 6/1994 | Burke et al. |
| 5,394,383 | A | | 2/1995 | Hira |
| 5,404,357 | A | | 4/1995 | Ito et al. |
| 5,434,837 | A | | 7/1995 | Haneda et al. |
| 5,499,225 | A | | 3/1996 | Yoshimura |
| 5,526,331 | A | | 6/1996 | Park et al. |
| 5,559,778 | A | | 9/1996 | Inokuchi et al. |
| 5,590,100 | A | | 12/1996 | Ogusu et al. |
| 5,706,261 | A | * | 1/1998 | Udagawa ..... 369/53.24 |
| 5,721,856 | A | | 2/1998 | Takeuchi |
| 5,737,290 | A | | 4/1998 | Ohmori |
| 5,754,521 | A | | 5/1998 | Yokota |
| 5,778,257 | A | | 7/1998 | Tsukatani et al. |

FOREIGN PATENT DOCUMENTS

| | | | |
|---|---|---|---|
| DE | 3830745 | A1 * | 3/1989 |
| DE | 3830745 | | 3/1989 |
| JP | H04-162250 | | 6/1992 |
| JP | H04-247324 | | 9/1992 |
| JP | H04-329423 | | 11/1992 |
| JP | H05-089468 | | 3/1993 |
| JP | H06-36522 | | 2/1994 |
| JP | H06-187740 | | 7/1994 |
| JP | H06-349068 | | 12/1994 |

* cited by examiner

*Primary Examiner*—Thang V Tran
(74) *Attorney, Agent, or Firm*—Drinker Biddle & Reath LLP

(57) ABSTRACT

A writable optical disc has at least two chapters comprising a first chapter and a second chapter. Management data including a partition address is written in a management area in each chapter, and information is written in an information recording area after management area in the first chapter. A partition data is written in a partition area after the information recording area of the first chapter. The partition data is erased when writing the second chapter, so that the first chapter is discriminated from the second chapter, and a partition data is written in a partition area of the second chapter after writing of information in an information recording area thereof.

3 Claims, 5 Drawing Sheets

WRITABLE OPTICAL DISC HAVING A PLURALITY OF CHAPTERS EACH HAVING RECORDING AREA, MANAGEMENT AREA AND PARTITION AREA PROVIDED THEREIN

Matter enclosed in heavy brackets [ ] appears in the original patent but forms no part of this reissue specification; matter printed in italics indicates the additions made by reissue.

This application *is a reissue of U.S. Pat. No. 5,889,742, filed on Jul. 8, 1998, which* is a divisional application of application Ser. No. 08/672,035, filed Jun. 26, 1996, now U.S. Pat. No. 5,808,992*, each of which claims the benefit of priority to Japanese Application No. 7-159643, filed Jun. 26, 1995.*

BACKGROUND OF THE INVENTION

The present invention relates to a method of recording information on a writable optical disc wherein information can be written only once in each recording area thereof, and a system for operating the disc.

A spiral pregroove is formed on the surface of the writable optical disc. A wobbling signal for keeping the linear velocity at recording constant and position information are stored in the pregroove. A laser beam is radiated on organic pigment applied on the inner surface of the pregroove, whereby the surface is subjected to chemical change, so that information is recorded.

Referring to FIG. 5a showing a conventional recording format of the writable optical disc such as a CD-R (CD recordable), in a pregroove area of the disc are formed a power calibration area PCA for checking the strength of the laser beam, lead-in areas LI, data recording areas DATA, and lead-out areas LO. The lead-in area LI, data recording area DATA, and lead-out area LO are formed every time a recording occurs The data recorded in each area is formatted as shown in FIG. 5b. Namely, a synchronizing signal SYNC and a synchronizing signal number S# are written at every predetermined length of each data.

In accordance with the conventional method, a large quantities of the lead-in data and lead-out data must be written at a time when data is recorded on the CD-R. If data are recorded many number of times, the number of the lead-in areas LI and lead-out areas LO increases, so that the area for recording the necessary data is decreased.

Upon reproduction of the data, since the recorded areas cannot be detected, the position of the last recorded lead-out area cannot be determined. The last recorded lead-out area is recognized only when the lead-out area next to the last recorded lead-out area is read to find that no data is recorded therein, that is, the lead-out area is an unformatted area. Since the lead-out area is unformatted, a synchronizing signal which is used for the spindle servo system cannot be obtained. As a result, the reproduced signal is not synchronized. The synchronized reproduced signal is obtained only after a complicated process.

SUMMARY OF THE INVENTION

An object of the present invention is to provide a method for recording information on a writable optical disc and a system thereof, wherein the area for recording the necessary information is not reduced although the recordings are executed many times, and wherein the position of the last recorded data can be easily detected.

According to the present invention, there is provided a method of recording information on a writable optical disc in at least two chapters comprising a first chapter and a second chapter, the steps comprising writing management data including a partition address in a management area in each chapter, writing information in an information recording area after management area in each chapter, writing a partition data in a partition area after the information recording area of the second chapter.

The method further comprises processing a partition area after the information area of the first chapter so that the first chapter is discriminated from the second chapter.

The writing in the second chapter is performed after finish of the discrimination between the first and second chapters.

The processing comprises writing a partition data at the recording in the first chapter, and erasing the partition data when data are written in the second chapter.

The present invention further provides a system for recording information on a writable optical disc in at least two chapters comprising a first chapter and a second chapter, comprising means for writing management data including a partition address in a management area in the first chapter, means for writing information in an information recording area after management area in the first chapter, means for writing a partition data in a partition area after the information recording area of the first chapter, reading means for reading the partition data in the partition area of the first chapter when recording the second chapter, means for processing the partition data in the partition area of the first chapter so that the first chapter is discriminated from the second chapter, means for writing data in the second chapter and a partition data in a partition area of the second chapter.

There is further provided a system for recording and reproducing information on a writable optical disc in at least two chapters comprising a first chapter and a second chapter, comprising means for writing management data including a partition address in a management area in the first chapter, means for writing information in an information recording area after management area in the first chapter, means for writing a partition data in a partition area after the information recording area of the first chapter, reading means for reading the partition data in the partition area of the first chapter when recording the second chapter, means for processing the partition data in the partition area of the first chapter so that the first chapter is discriminated from the second chapter, means for writing data in the second chapter and a partition data in a partition area of the second chapter, means for reading the partition data in the second chapter, reproducing means for reproducing data in the chapter designated by an input command after confirmation of the partition data in the second chapter.

These and other objects and features of the present invention will become more apparent from the following detailed description with reference to the accompanying drawings.

DETAILED DESCRIPTION OF THE PREFERRED EMBODIMENT

Figure 4A:
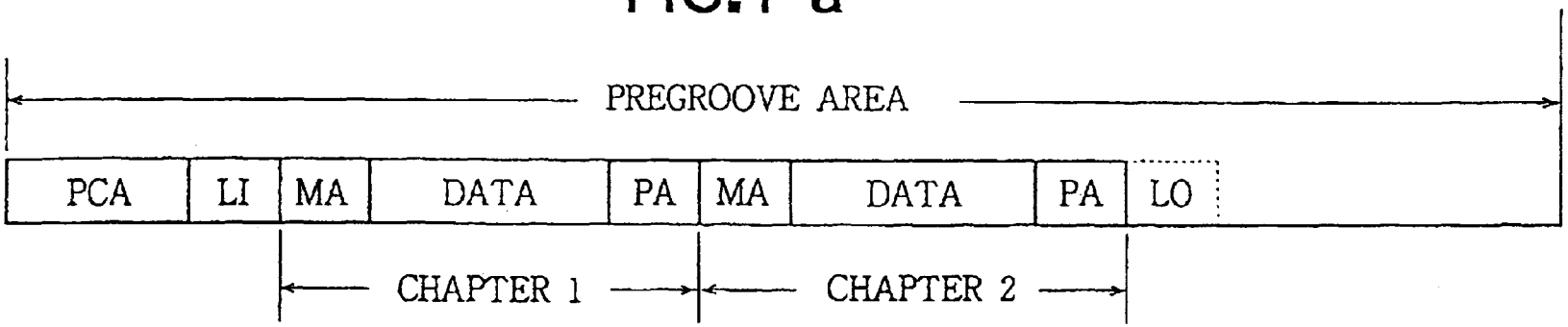
FIG. 4a is a diagram showing a format for recording data on the writable disc in accordance with the present invention.
Figure 4B:
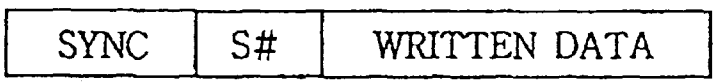
FIG. 4b is a diagram showing a data format of the data recorded on the disc.

The principle of the present invention is described with reference to FIGS. 4a and 4b, showing the recording format according to the present invention, and a data format, respectively.

Figure 5A:
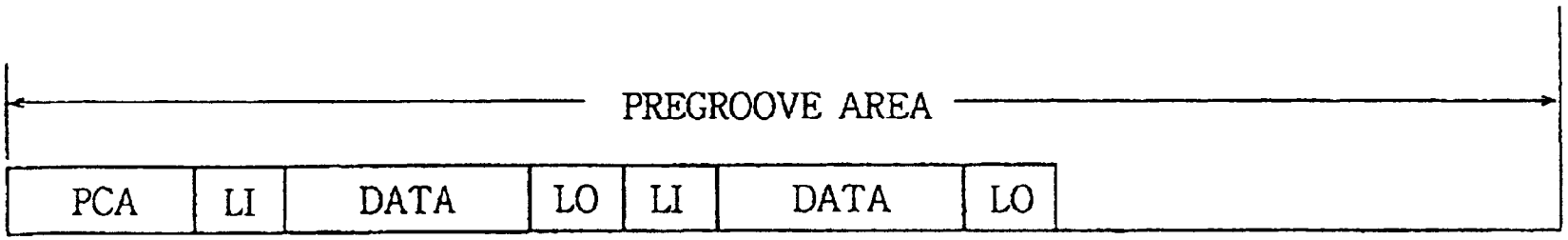
FIG.5 a PRIOR ART
FIG. 5a is a diagram showing a conventional format for recording data on the writable disc.
Figure 5B:
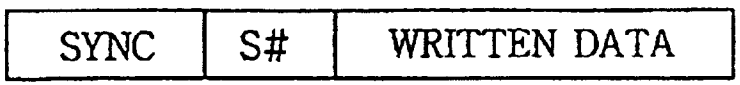
FIG.5 b PRIOR ART
FIG. 5b is a diagram showing a data format of the data recorded on the disc.

Referring to FIG. 4a, the power calibration area PCA, lead-in area LI and the lead-out area LO are formed as in the conventional format shown in FIG. 5a. However, the lead-in area LI and lead-out area LO are provided only before an information recording area DATA of a first chapter where the recording data are stored, and after an information recording area of a second chapter where the last recording data for the disc are stored, respectively.

The data for each recording area, which is herein referred to as a chapter, is provided with a management information area MA in front of the area DATA for recording a management information, and a partition data area PA at the rear of the area DATA for writing a predetermined binary data P indicating the last recording position. The address of the partition area PA is previously calculated. The management information includes a directory of the data to be recorded in the area DATA and the partition address. Since the quantities of the management information and the partition data are much smaller than the lead-in data and lead-out data, the problem of the decrease in the area for writing data is largely reduced.

More particularly, at a first recording when Chapter 1 is recorded, the partition data P is recorded in the partition area PA of the Chapter 1. When recording Chapter 2, the management area MA of the Chapter 1 is read to obtain the address of the partition area PA in the Chapter 1. In the partition area PA, a proper data E is written on the data P so that the data P cannot be read out. Thereafter, the management information and the data are written in the areas MA and DATA of the Chapter 2, and in the partition area PA, the partition data P is written. Hence, although the recording is repeated a number of times, the partition data P in a partition area of the last chapter is erased, so that the last recording position can be detected.

The synchronizing signal SYNC and the synchronizing signal number S# are written at every predetermined length of each data in the same manner as in the conventional method as shown in FIG. 4b.

Figure 1:
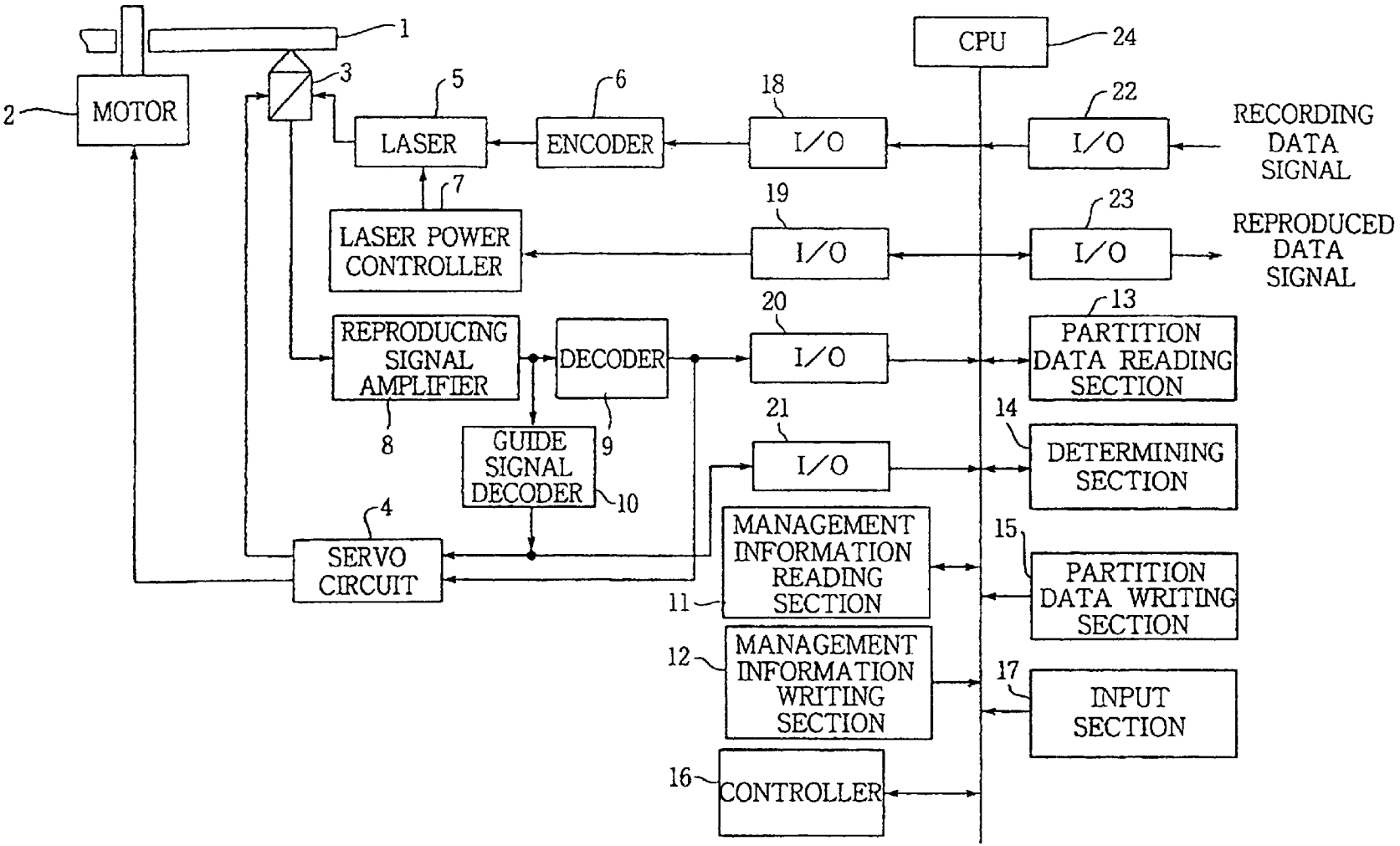
FIG. 1 is a block diagram of a system for recording and reading data on and from a writable optical disc according to the present invention.

A system for thus recording information on an optical disc and for reading the information is described hereinafter with reference to FIG. 1.

A recording data signal to be recorded on a writable optical disc (CD-R) 1 is applied to an encoder 6 through I/O interfaces 22 and 18 in accordance with the operation of an input section 17. The encoded signal is fed to a laser 5 so that the output thereof is modulated. A laser beam corresponding to the data signal is emitted from the laser 5 and transmitted through a read/write head (not shown) provided in a pickup 3 so as to be focused on the optical disc 1 which is driven by a motor 2.

A laser power control circuit 7 is provided to control the power of the laser beam at the optimum level. Namely, a controller 16 applies a control signal to the laser power controller 7 through an I/O interface 19 to increase the laser power so that a test signal is recorded in the PCA shown in FIG. 4a. The reproduced test signal is applied to a reproducing signal amplifier 8 through the read/write head of the pickup 3. The reproduced test signal is decoded at a guide signal decoder 10 and fed to a controller 16 through an I/O interface 21. The controller 16 checks whether appropriate power is applied at recording, and accordingly applies a power control signal to the laser power controller 7, thereby to provide the optimum power.

The input section 17 is also operated when reproducing the data signal. The reproduced data signal is read by the read/write head of the pickup 3 and applied to the reproducing signal amplifier 8. The reproduced signal is decoded at a decoder 9 and outputted through I/O interfaces 20 and 23.

The reproduced signal from the amplifier 8 is applied to a servo circuit 4 through the guide signal decoder 10. The decoded reproduced data signal is also fed to the servo circuit 4. The servo circuit 4 controls the pickup 3 and the motor 2 in accordance with the reproduced signals, thereby operating a focus servo system, track-following servo system and the spindle servo system.

The system of the present invention is further provided with various devices for controlling the recording of information on the optical disc 1. A management information writing section 12 produces management information such as the directory of the recorded data and the position address of the partition data and applies it to the laser 5 through the I/O interface 18 and the encoder 6. Hence the output laser beam of the laser 5 is modulated. The laser beam is focused on the management area MA of the disc 1 by the pickup 3 so as to write the management information therein.

The management information recorded in the area MA is read out in accordance with a control signal from the controller 16. The reproduced management information signal is fed through the reproducing signal amplifier 8, decoder 9 and the I/O interface 20 to a management information reading section 11.

A partition data writing section 15 selectively produces the partition data P and E, in accordance with a control signal from the controller 16. The data P and data E are applied to the encoder 6 through the I/O interface 18 so that the laser 5 emits a corresponding laser beam which is applied to the optical disc 1 so as to write the partition data P or E in the partition area PA.

The partition data P is read out from the address which is included in the management information. The partition data is fed to a partition data reading section 13 through the reproducing signal amplifier 8, decoder 9 and the I/O interface 20. The read out partition data is applied to a determining section 14 which determines whether the data is the data P or the erased data. A CPU 24 is further provided to control other devices in the system.

Figure 2:
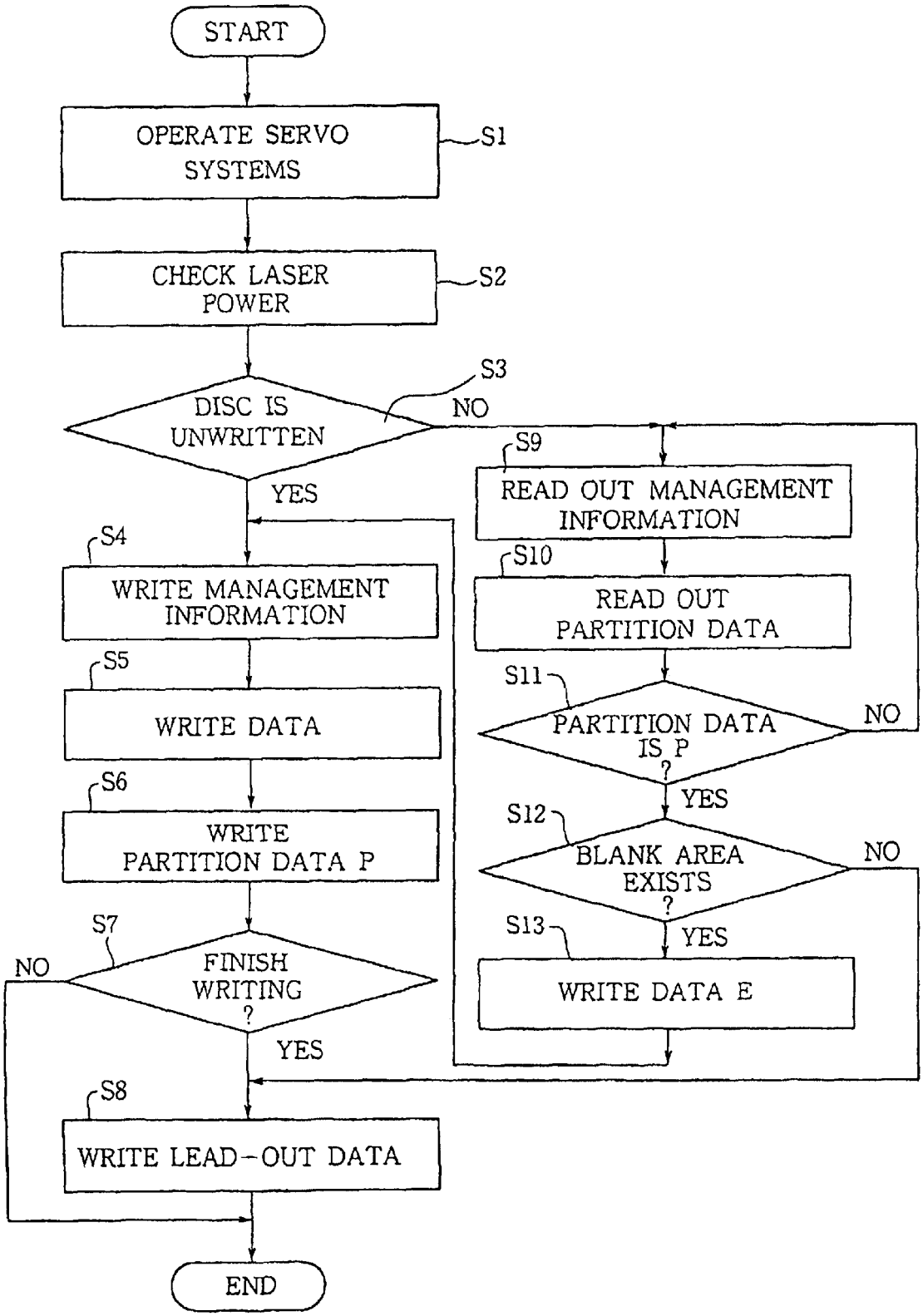
FIG. 2 is a flowchart describing the operation of the system of FIG. 1 when recording data.

The recording operation of the system of the present invention is described hereinafter with reference to FIG. 2.

At a step S1, the servo circuit 4 is actuated to control the driving of the motor 2 and the pickup 3 so that the spindle servo system, focus servo system and track-following servo system are operated throughout the recording operation. At a step S2, the test signal is written in the PCA of the optical disc 1, thereby to check the power of the laser beam and set it at an optimum value for recording.

Thereafter, at a step S3, it is determined whether or not the entire recording area of the optical disc 1 is unwritten. When the disc is unwritten, the program goes to a step S4 wherein the management information such as the directory of the data and the address of the corresponding partition area is written in the management area MA of the Chapter 1 shown in FIG. 4a. Thereafter, the recording data is written in the data recording area DATA of the Chapter 1 at a step S5. After the recording data is written, the partition data P is written in the partition area PA of the chapter 1 at the address designated in the management information.

When all of the data is written, it is determined at a step S7 whether a signal commanding the system to end the recording is inputted from the input section 17. If it is the case, the program goes from a step S8 where the lead-out data is written in the lead-out area LO shown in FIG. 4a. If the input signal is not inputted, the program is ended without writing the lead-out data.

If it is determined at the step S3 that data is already written on a part of the disc 1, the program goes to a step S9 where the management information of the Chapter 1 is read out. At a step S10, data is read out from the address of the partition area PA included in the management information obtained at the step S9.

When it is determined at a step S11 that the read out partition data is the data P, it means that the Chapter 1 is the last recorded area. Thereafter, the program proceeds to a step S12.

When data in the partition data is not read out, it means that other chapters are written subsequent to the Chapter 1. The program accordingly returns to the step S9 and S10 so that the management information and the data are read out from the management area MA and the partition area PA of the Chapter 2. The steps S9 to S11 are repeated until the partition data P is detected.

At a step S12, it is determined whether there exists a blank area wherein the data can be recorded. The blank is determined by comparing the quantity of information to be recorded with a remaining area which is obtained from the recording capacity of the disc and the position of the last partition area. When there is an unwritten area left, the partition data P of the last chapter is erased by the data E. Thereafter, the programs from step S4 to step 58 are executed so that the management information, recording data and the partition data P are written in respective areas MA, DATA and PA of the next chapter. Thus the partition data P is written only in the partition area PA of the last chapter.

If it is determined at the S12 that the blank area no longer exists, the program goes to the step 58 where a lead-out data is written to end the recording operation.

The step S4 may be modified to write not only thee management information of the data to be written, but also the management information of other data already recorded, which is read out at the step S9. Thus, by looking up the management information of the last chapter, the information on all of the recorded data can be easily read out.

In addition, in order to determine the last recorded chapter, instead of discriminating the partition data P, the partition area PA of the last recorded chapter may be left unwritten. The chapter having a blank partition area PA can be detected as the last recorded chapter and the partition data P is written therein before writing the next chapter. Therefore, if the data P is read out at the next recording, it is found that the chapter is not the last one. Although the partition data is not written, since the synchronizing signal SYNC and the synchronizing signal number S# are inherently written, the reproduced signals can be synchronized.

Figure 3:
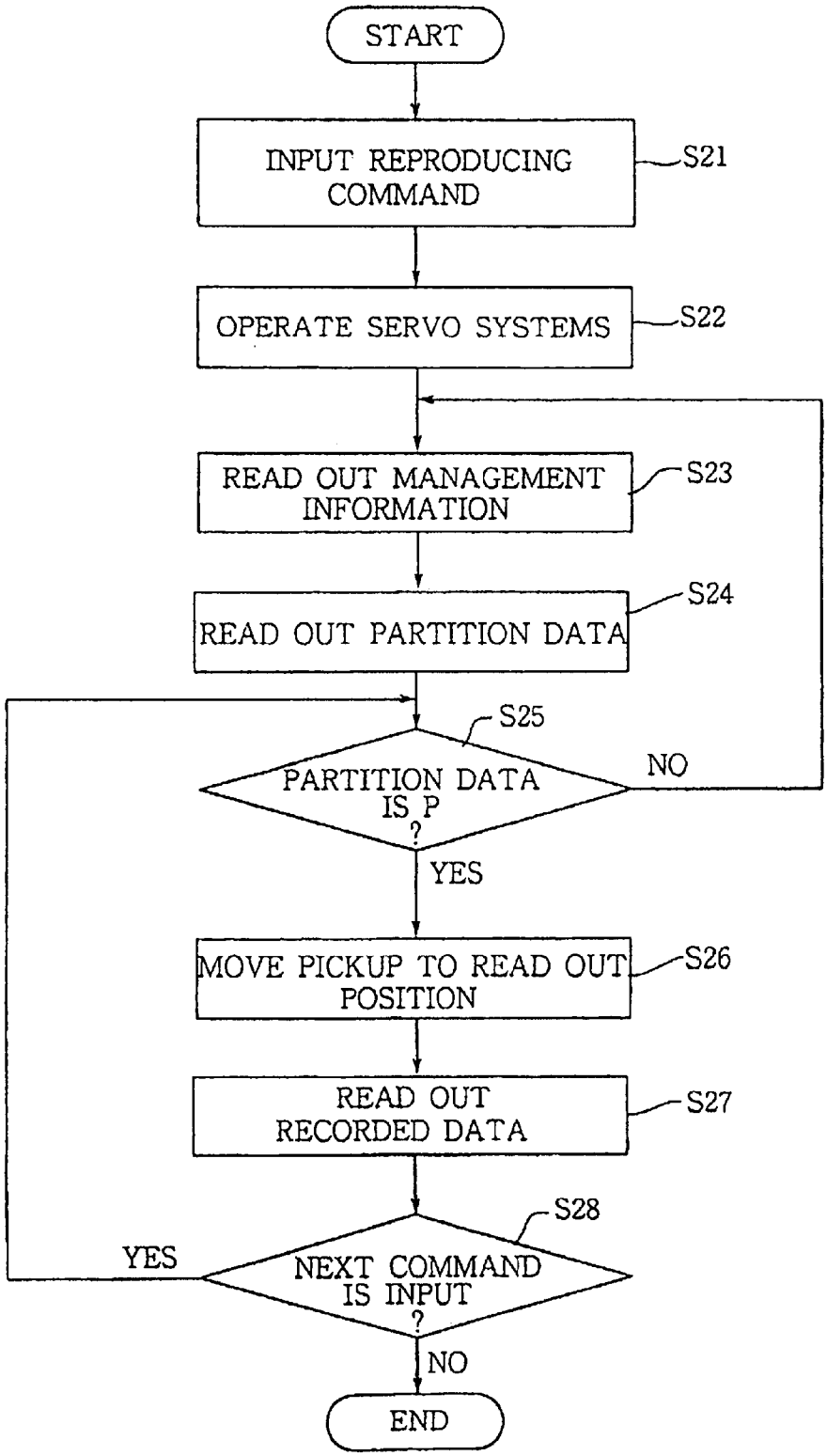
FIG. 3 is a flowchart describing the operation of the system when reading out data.

The operation for reading out data is described with reference to the flowchart of FIG. 3.

When an input signal to command the reproduction is inputted at a step S21, the spindle servo system, focus servo system, and the track-following servo systems are operated at a step S22. Thereafter, at a step S3, the management information is read out from the management area of the Chapter 1, and at a step S24, the partition data is read out from the partition area PA thereof, dependent on the partition address included in the management information.

When it is determined at a step S25 that the read out partition data is the data P, the program proceeds to a step S26. When the read out partition data P is not read out, the program returns to the step S23, thereby repeating the steps S23 to 25. The partition data in other chapters are hence read out until the partition data P is found. The area in which the data P is written is the last recorded area.

At the step S26, a read/write head of the pickup 3 is moved to a position instructed by the command inputted at the step S21. The position is determined by looking up the management information of the chapter. The desired recorded data is accordingly read out at a step S27. After the data is read out, when it is determined at a step S28 that there is a next command, the steps S26 and S27 are repeated. The program ends when no other command is inputted.

In accordance with the present invention, the management information such as the directory of the recorded data and the partition address indicating the end position of the data is recorded before the data, and the partition data is recorded after the last recorded data. The partition data is erased or changed to another data at each recording before the last data area so that the partition data of the last chapter can be distinguished from other partition data. Hence, although the number of recordings is increased, the area for recording the necessary data are not largely decreased, and moreover, the position of the last added data can be easily detected. At reproduction, the pickup is moved in accordance with the input command within the end position of the last recorded data, which is determined by looking up the partition data. Thus the pickup is not moved to the area which is not formatted so that the read out signals are always synchronized, thereby enabling to start the reproducing operation at once.

While the invention has been described in conjunction with preferred specific embodiment thereof, it will be understood that this description is intended to illustrate and not limit the scope of the invention, which is defined by the following claims.

What is claimed is:

1. A writable optical disc comprising:

a plurality of chapters;

a lead-in area provided before a first chapter wherein recording data are stored;

an information recording area, a partition area *including at least a synchronizing signal and* for indicating a last chapter, and a management information area for writing an address of the partition area, which are provided in each of the chapters; and a lead-out area provided after the last chapter.

2. The writable optical disc according to claim 1, wherein the management information area is located before the information recording area, and the partition area is located after the information recording area.

*3. The writable optical disc according to claim 1, wherein the partition area further includes an unwritten area.*

* * * * *